April 9, 1968     G. C. SITZ     3,376,627
WIRE STRIPPING APPARATUS

Filed Nov. 26, 1965     9 Sheets-Sheet 1

INVENTOR.
BY GILBERT CARL SITZ

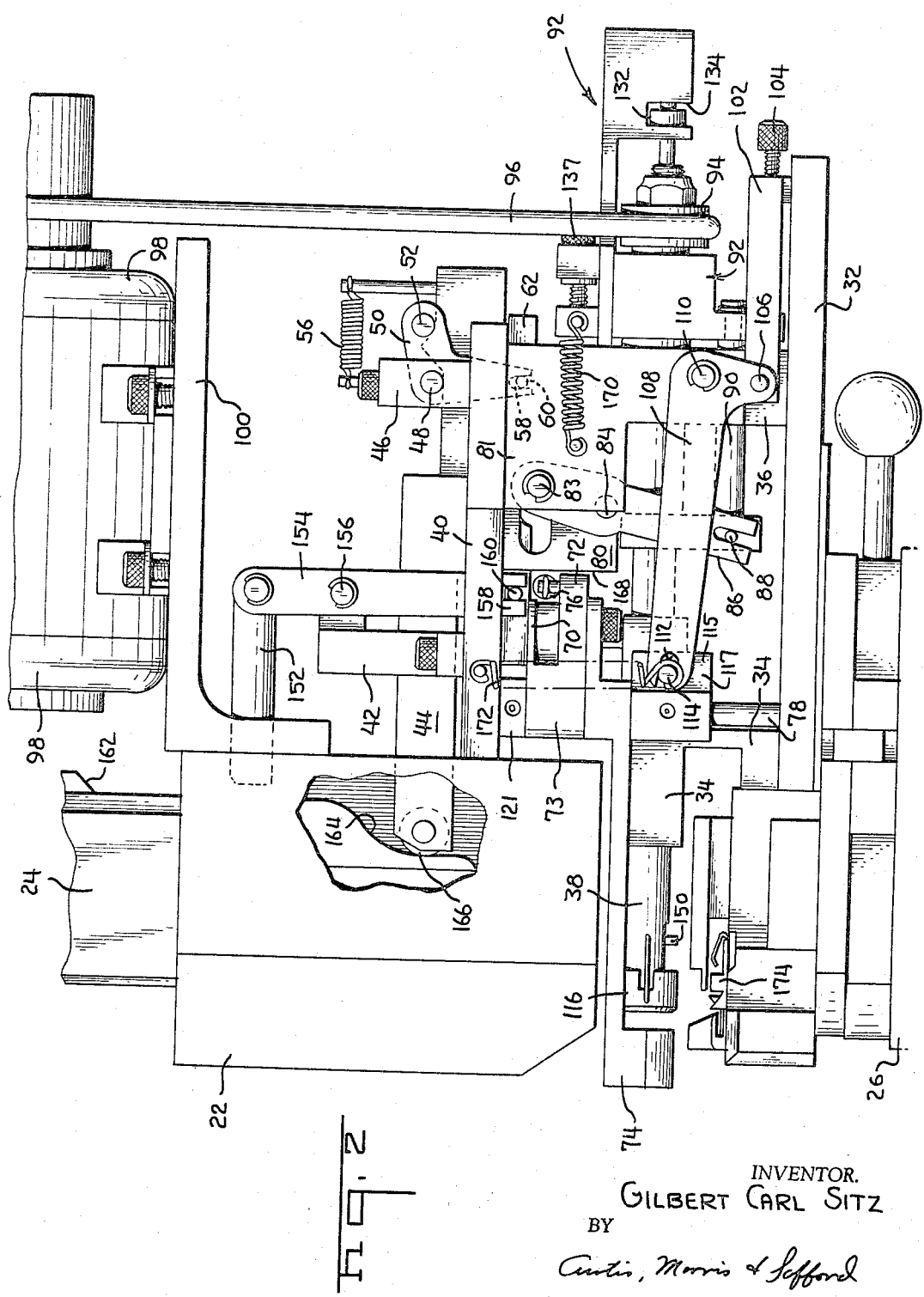

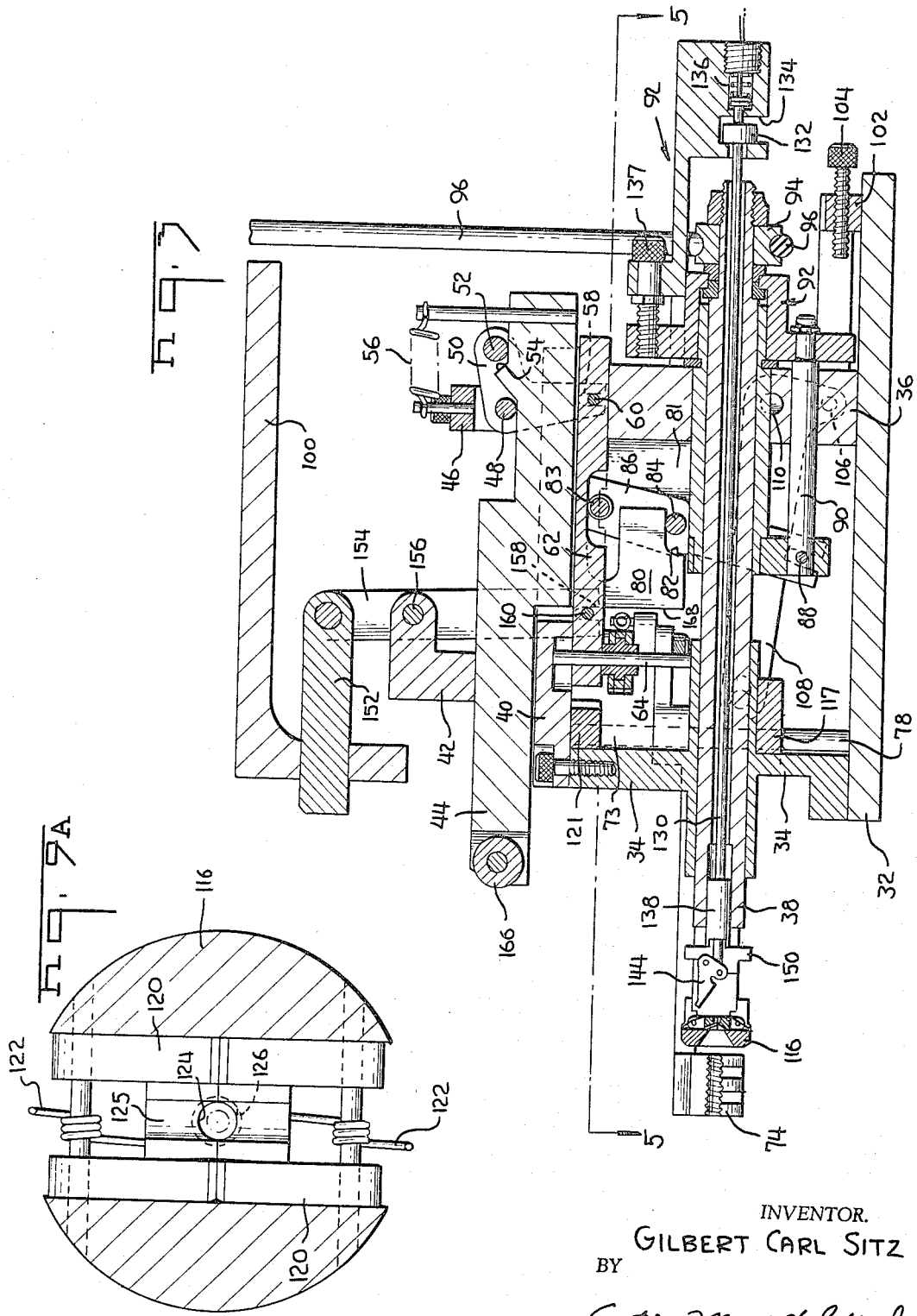

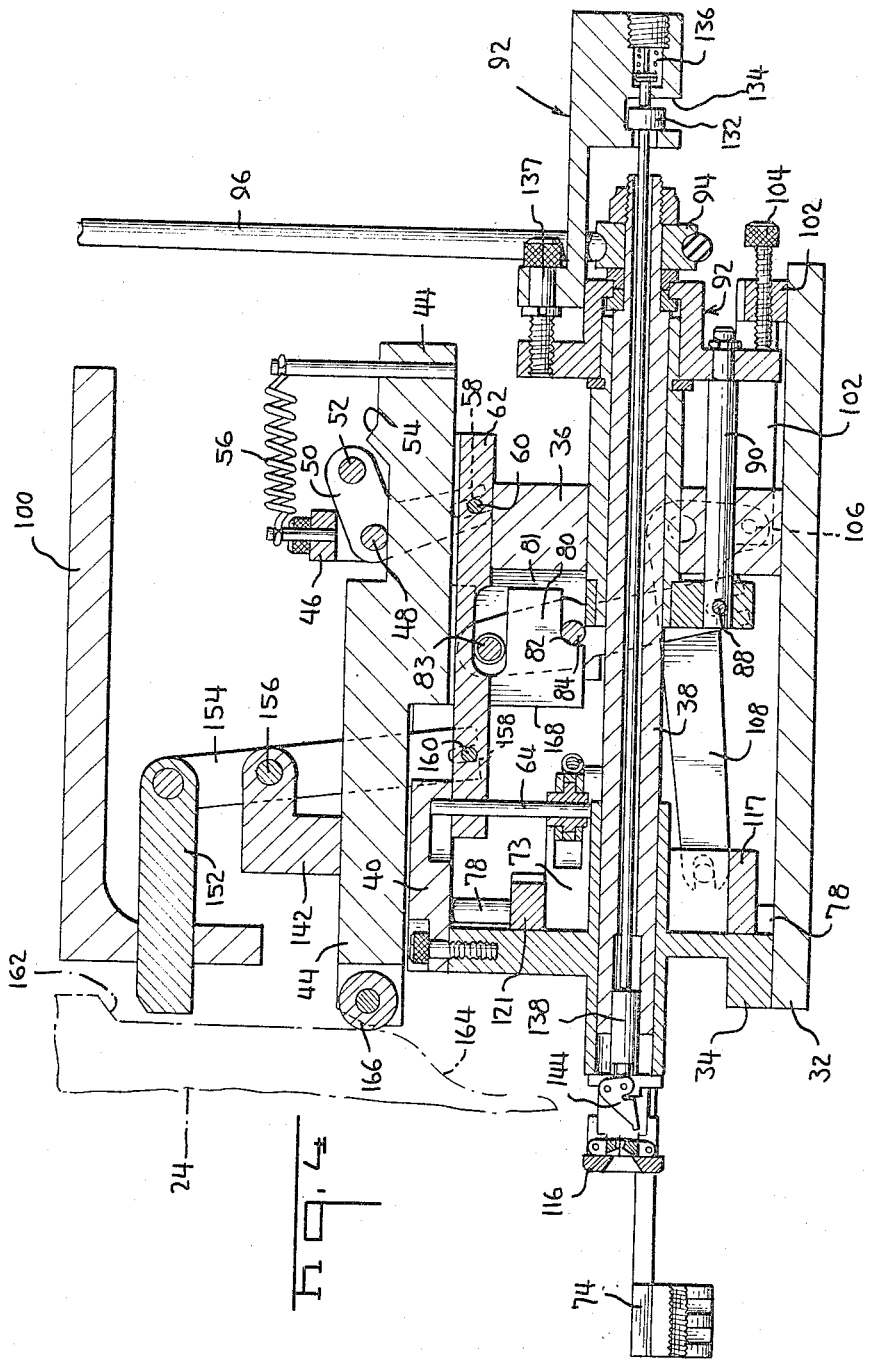

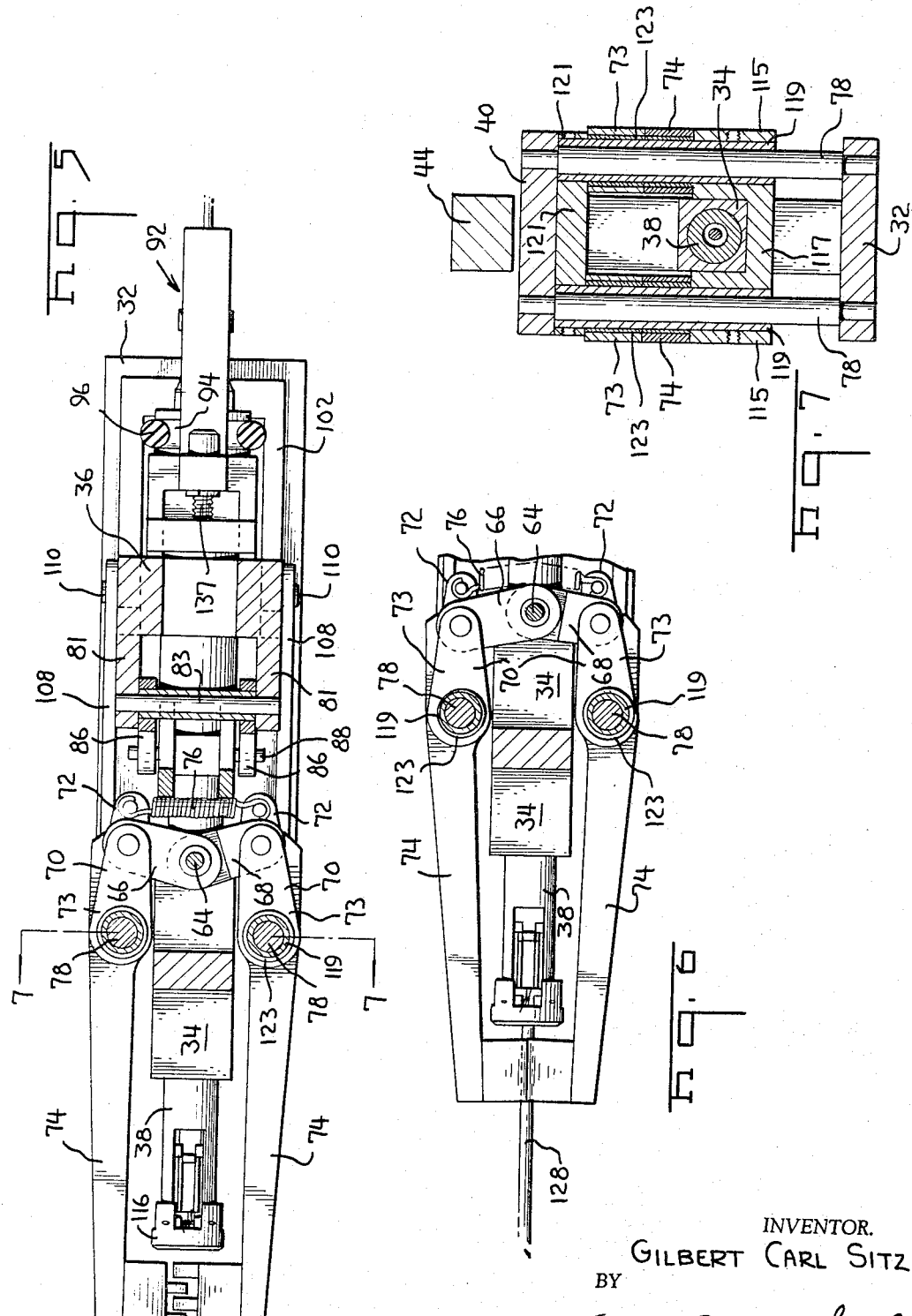

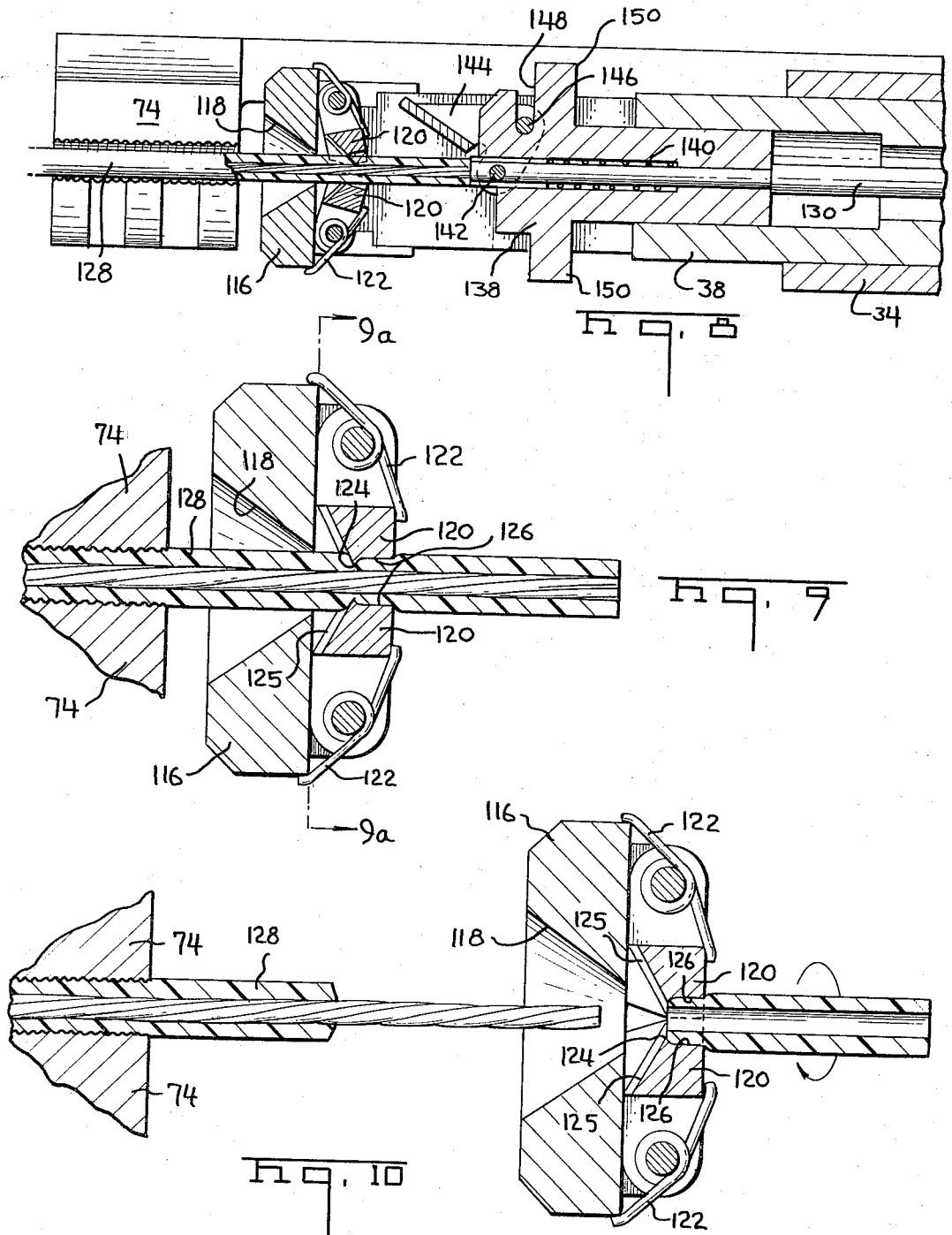

April 9, 1968

G. C. SITZ 3,376,627

WIRE STRIPPING APPARATUS

Filed Nov. 26, 1965

INVENTOR.
GILBERT CARL SITZ
BY
Curtis, Morris + Safford

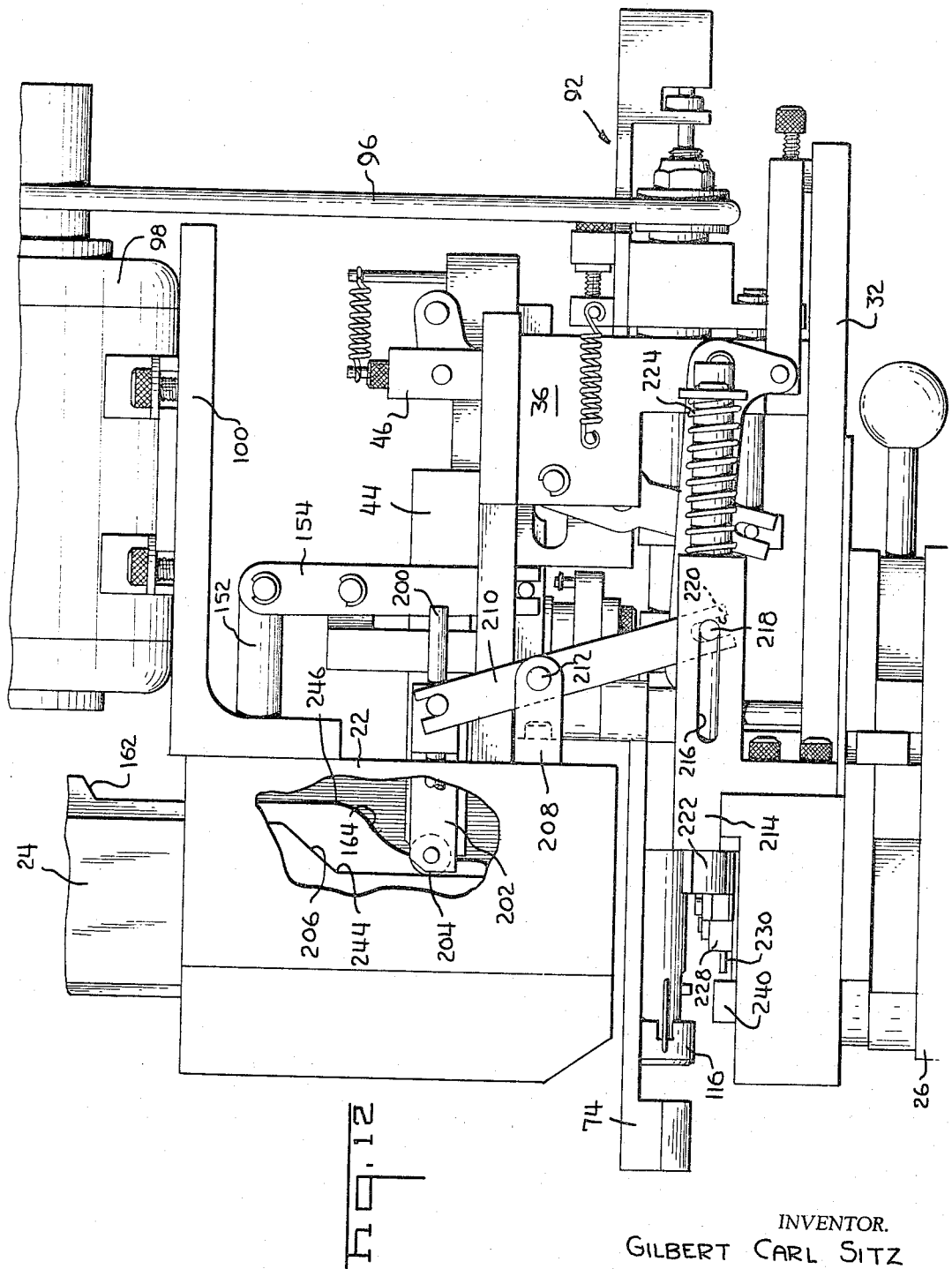

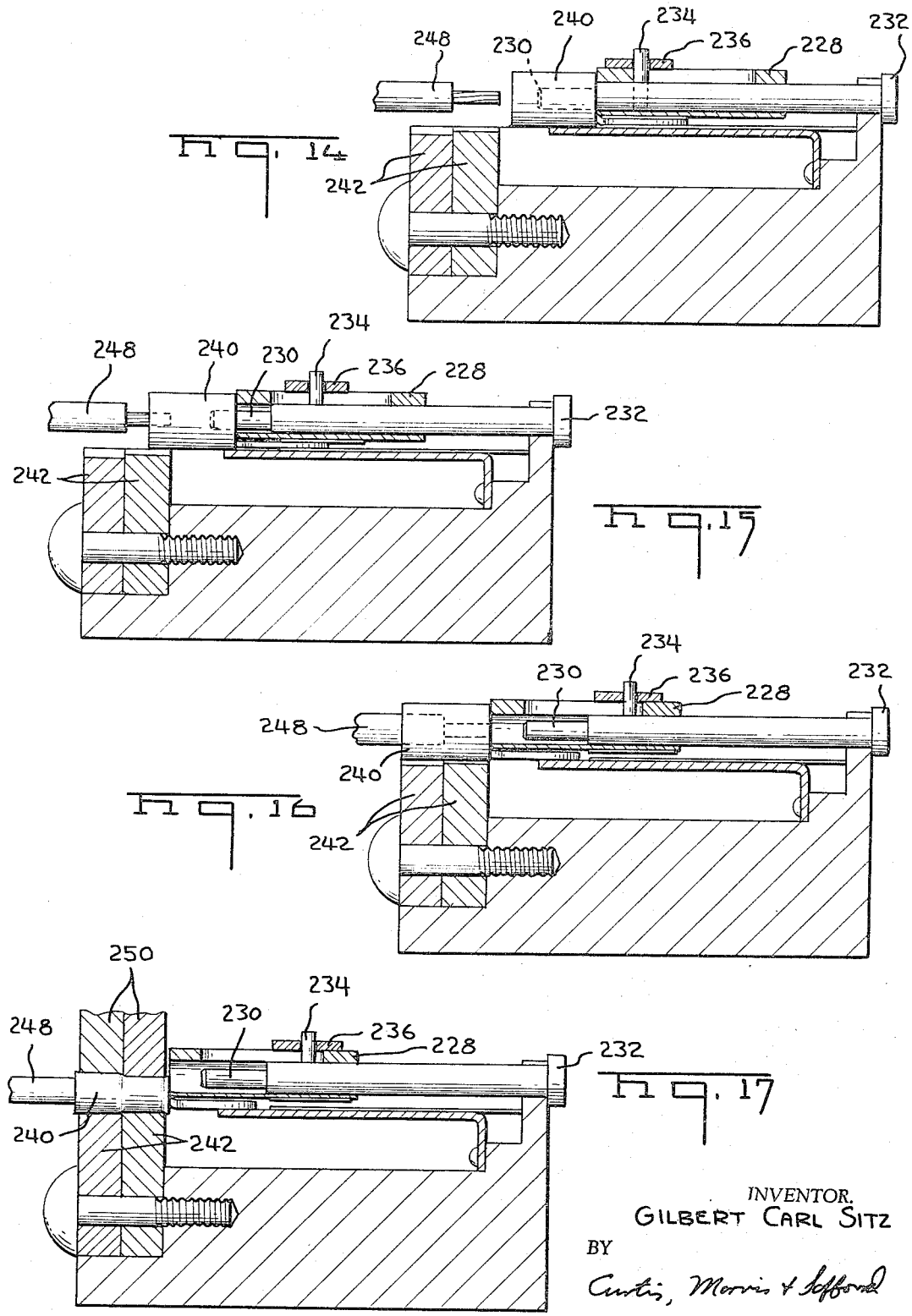

United States Patent Office 3,376,627
Patented Apr. 9, 1968

3,376,627
WIRE STRIPPING APPARATUS
Gilbert Carl Sitz, Harrisburg, Pa., assignor to AMP
Incorporated, Harrisburg, Pa.
Filed Nov. 26, 1965, Ser. No. 509,833
13 Claims. (Cl. 29—203)

ABSTRACT OF THE DISCLOSURE

A machine is provided for stripping the end of a wire conductor and for subsequently locating the conductor in position on an applicator for securing the conductor to an electrical terminal. The stripping head is rotatable and axially displaceable to effect the stripping operation. A gripping mechanism is provided for holding the conductor during the stripping operation and for moving the conductor into position for securing to a terminal.

It is the customary practice today to feed lengths of wire into a wire stripping machine to remove the insulation therefrom and subsequently to collect the wire and thereafter feed the same to a separate terminal applying machine. There are many advantages to combining the wire stripping operation and the terminal applying operation into a single machine. One advantage is that fewer machines require fewer operators to maintain them. Another advantage resides in a great savings in time due to the fact that a single stroke of a press ram will actuate both the wire stripping and terminal applying operations. Still another advantage resides in the fact that the stripped wire is immediately secured to a terminal to thereby do away with the requirement of having stripped wire in storage, such storage allowing the bare conductor of the wire to become frayed and to collect foreign matter.

It is therefore an object of the present invention to provide a machine which will effect the stripping of a wire and the application of a terminal thereto.

Another object is to provide an improved stripping means whereby the several strands of the bared conductor within the stripped wire are axially twisted into a rigid form.

A further object is to provide a device for applying both open barrel and closed barrel terminals to a stripped wire.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

FIGURE 2 is a side elevational view of the machine of FIGURE 1;

FIGURE 3 is a side cross-sectional view of the device of FIGURE 1 showing the parts in their normal at rest position;

FIGURE 4 is a cross-sectional view similar to FIGURE 3 but showing the parts in position after the stripping operation has been performed;

FIGURE 5 is a top view, partly in section, taken along the line 5—5 of FIGURE 3;

FIGURE 6 is a fragmentary top view, similar to FIGURE 5, showing the wire gripping jaws in their closed position;

FIGURE 7 is a cross-sectional view taken along the line 7—7 of FIGURE 5;

FIGURE 8 is an enlarged cross-sectional view of the wire stripping head at the beginning of its cycle of operation;

FIGURE 9 is a cross-sectional view similar to FIGURE 8 showing the wire stripping blades in their cutting position;

FIGURE 9A is a view partly in section taken along the line 9A—9A of FIGURE 9;

FIGURE 10 is a cross-sectional view similar to FIGURES 8 and 9 showing the stripping head after the stripping operation has been completed;

FIGURE 12 is a side elevational view showing the mechanism of FIGURE 11 incorporated into the device of FIGURE 1;

FIGURES 13 through 17 are enlarged cross-sectional views showing the various operative positions of the device of FIGURE 12.

Figure 1:
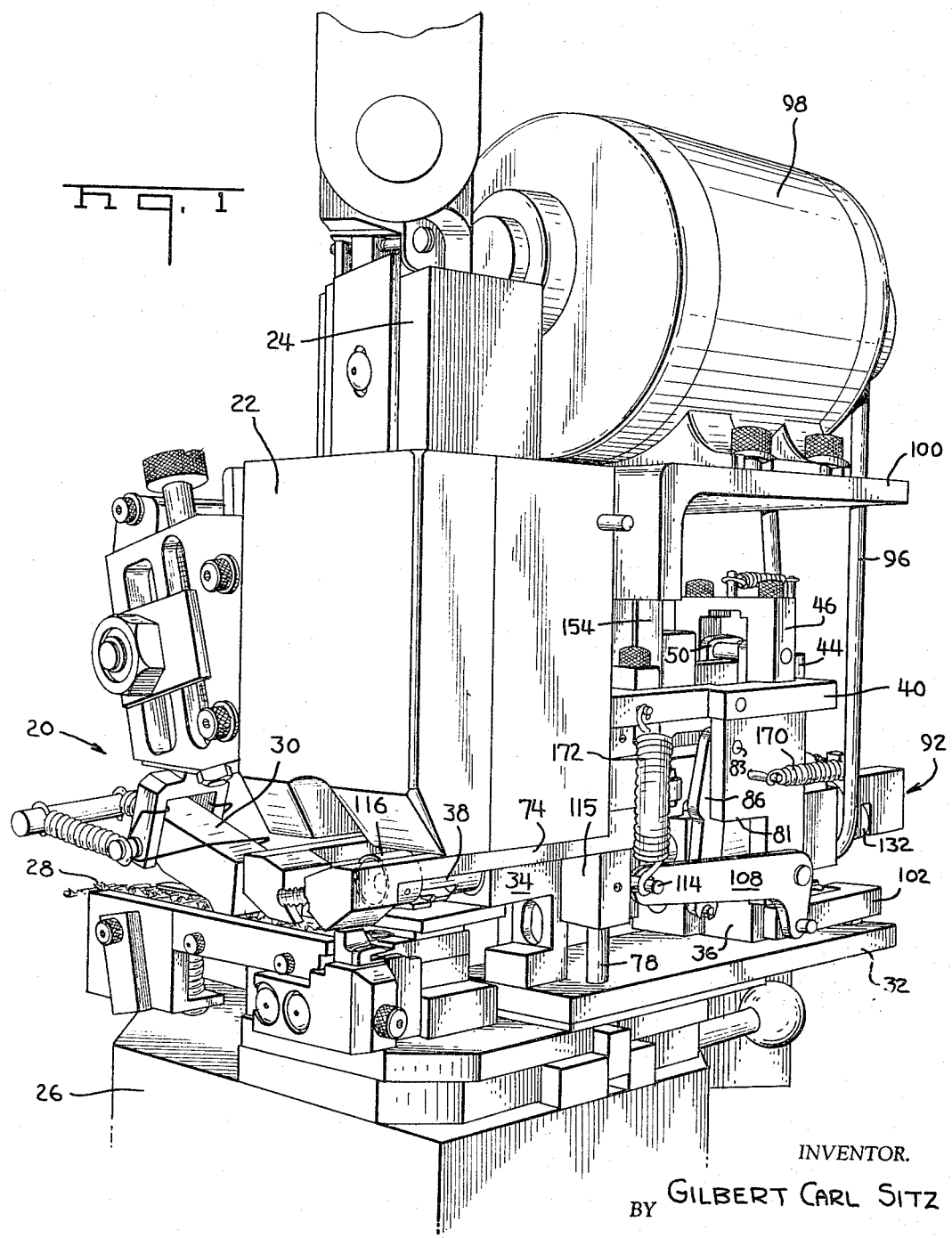
FIGURE 1 is a perspective view of a machine made in conformance with the teachings of the present invention.

With reference to FIGURE 1 there is shown an applicator 20 having an upper arm 22 which slidably receives a ram 24. A bed 26 is provided upon which the applicator itself is mounted. For a complete description of the applicator reference is herein made to U.S. Patent No. 3,184,950 granted to Gilbert C. Sitz on May 25, 1965. The ram 24 is driven through a single forward and return stroke by means of a suitable press. The particular press shown, by way of example only, is that disclosed in copending U.S. application No. 404,051 filed Oct. 15, 1964, by David Ronald Kerns entitled "Crimping Press" and having a common assignee with the present invention.

A strip of terminals 28 is intermittently advanced by means of a feed assembly 30 to position the lead terminal of the strip over a stationary crimping member to thereby be in position to be crimped to an electrical conductor by means of a movable crimping member secured to the lower end of ram 24, all of which is completely described in the abovementioned U.S. Patent 3,184,950.

In FIGURES 2 and 3 there is shown the stripping mechanism and the means for transferring the stripped wire into crimping position. A lower stationary plate 32 is secured to the applicator 20. Secured to lower plate 32 is a front bushing 34 and a rear guide block 36. The bushing 34 and block 36 define a path for guiding the axial reciprocation of a spindle 38 to be described. An upper plate 40 is secured to bushing 34 and block 36 to thereby form a rigid box-like structure.

A bracket 42 is secured to upper plate 40 and cooperates therewith to form a channel for guiding the reciprocatory movement of a main slide member 44. A U-shaped bracket 46 is secured to upper plate 40 and has a pin 48 secured thereto for pivotally carrying the bellcrank 50. The bellcrank 50 has a camming roller 52 thereon for actuation by a camming surface 54 on the main slide 44. A spring 56 is connected to bracket 46 and main slide 44 for biasing the main slide to the left as seen in FIGURE 3. The other leg of bellcrank 50 is bifurcated as shown at 58 to receive a pin 60 secured to a second slide member 62. It can be seen that rightward movement of slide 44 will cause camming surface 54 to engage camming roller 52 and thereby cause counterclockwise movement of bellcrank 50 and resultant rightward movement of slide 62 by means of pin 60.

A vertically extending pin 64 is secured to the forward end of slide 62. The lower end of pin 64 rides along a surface of bushing 34 and the upper end of pin 64 rides within a groove formed in the upper plate 40. As best seen in FIGURES 5 and 6 pin 64 controls the movement of a toggle linkage which opens and closes the jaws of the wire gripping and transferring means. A pair of links 66 and 68 are pivotally connected to pin 64, the said links being connected at their outer ends beween the bifurcated arms 70 and 72 of a pair of links 73 adjustably connected to the gripping jaws 74. The arms 72 are somewhat longer than arms 70 and carry a spring member 76 for holding the toggle linkage in position. Referring again to FIGURE 3 it can be seen that movement of slide 62 to the right will result in movement of pin 64 to the right and thereby cause the jaws 74 to move from their position in FIGURE 5 to the closed position shown in FIGURE 6.

The gripping jaws 74 are pivotally carried on a pair of posts 78, the said posts being secured between lower plate 32 and upper plate 40. The jaws are capable of pivotal movement relative to posts 78 and also reciprocal movement along the axis of posts 78, the said reciprocal movement being for a purpose to be described.

The main slide 44 has integrally formed thereon a depending leg portion 80, the depending leg having a surface 82 for engaging a pin 84 carried on a lever 86. The lever 86 is pivotally secured at 83 to a pair of ears 81 of rear guide block 36. Rightward movement of slide 44 will cause surface 82 to contact pin 84 to swing the lever 86 in a counterclockwise direction as viewed in FIGURE 3. The lower end of lever 86 carries a pin and slot connection 88 whereby counterclockwise movement of lever 86 will cause rightward movement of a rod member 90. The rod 90 is secured to a bracket assembly 92, which assembly encircles spindle 38. The spindle 38 is free for rotary movement relative to assembly 92 but is restrained against axial movement relative to the said assembly. Rotary movement is imparted to spindle 38 by means of a pulley 94 which carries the belt 96, the said belt being driven by an electric motor 98. The motor 98 is fixed to upper arm 22 by means of a mounting bracket 100. It can thus be seen that rightward movement of rod 90 will cause the subsequent rightward movement of assembly 92 and spindle 38.

A U-shaped block 102 is slidably disposed on lower plate 32 and carries an adjustable screw member 104 therein. As bracket assembly 92 moves to the right it will contact screw member 104 to thereby cause rightward movement of U-shaped block 102. The arms of block 102 carry a pin 106 which is secured to a bellcrank 108. Bellcrank 108 is movable about pivot pin 110 secured to guideblock 36. It is to be noted at this point that the stripping device is generally symmetrical in a horizontal plane about the axis extending through the spindle 38 as can be seen in FIGURE 5. Therefore while several parts have been described in the singular, there are in reality two such parts symmetrically disposed about the center line of the spindle. Bellcrank 108 has an elongated arm having a bifurcated end 112 for receiving a pin 114 fixed to a pair of legs 115 of a U-shaped member 117. Member 117 is secured to a pair of sleeves 119 by set screws or the like, sleeves 119 surrounding the posts 78. A cap member 121 is also secured to sleeves 119 to thereby form an assembly (see FIGURE 7) which can slide as a unit on posts 78. A bearing 123 is disposed about each sleeve 119 between member 117 and cap 121 to thus permit the link 73 and jaws 74 to pivot freely about the posts 78. Therefore, when bracket assembly 92 contacts screw 104 the block 102 is slid to the right as seen in FIGURES 3 and 4 to thereby cause bellcrank 108 to pivot in a counterclockwise direction causing the gripping jaws 74 to be moved downwardy from their position shown in FIGURE 3 to their position shown in FIGURE 4. As will become apparent, this downward movement is for the purpose of moving the wire conductor from its stripping position to its crimping position within a terminal.

The wire stripping mechanism will now be described in detail with reference to FIGURES 8 through 10. A stripper blade holder 116 is secured to the end of spindle 38. The holder 116 has a conical recess 118 formed in its forward face for serving as a guide for the entrance of an electrical conductor. A pair of stripping blades 120 are pivotally secured to holder 116 and are biased toward each other by means of a pair of springs 122. The stripper blades 120 have cutting surfaces 124 which are generally semi-circular over a majority of their extent when viewed from the left in FIGURE 9, and channels 125 for guiding the wire toward surfaces 124, see FIGURE 9A. The blades 120 are formed with cut-back portions 126 immediately behind the cutting edges 124, the cut-back portions serving to firmly grasp the insulation around the wire conductor when the blades 120 are in their position shown in FIGURE 9. The spacing between the blades 120 is such that the cutting edges 124 are slightly farther apart than the diameter of the center conductor of the wire to insure against possible nicking of the center conductor during the stripping operation. The distance between the cut-back portions 126 is slightly less than the diameter of the outer insulation around the wire conductor and these portions 126 serve a twofold purpose, the first being to insure that the stripped portion of the wire conductor is held in axial alignment with the remainder of the conductor to thereby further insure against any possible nicking of the center conductor and second the portions 126 will firmly grasp the insulation around the wire conductor and, since the stripper blades 120 are rotating along with spindle 38, the portions 126 will rotate the severed portion of insulation around the conductor to thereby produce an axial twist on the bared end of the center conductor of the wire. This axial twisting produces a bared end which is quite rigid to thereby enhance the subsequent placing of the stripped wire within a terminal member. It is to be noted that the actual severing of the insulation of the wire conductor is due to a combined action, the first being the slicing of the conductor by the cutting edges 124 and the second being the twisting of the free end of the insulation to thereby shear off the remaining portion of insulation lying between the inner edge of the blades 120 and the center conductor of the wire.

An examination of FIGURES 8 and 9 will show the method of operation of the blades 120. Upon initial insertion of a wire conductor 128 into the recess 118 and between the blades 120 the said blades will be forced against the bias of springs 122 into their position shown in FIGURE 8. When the spindle is moved to the right as seen in FIGURE 8 the cutting edges 124 will bite into the insulation on the wire conductor and force the blades 120 into their position shown in FIGURE 9, the latter position being the operative cutting position of the blades.

Disposed within spindle 38 is an elongated rod 130 which is capable of limited axial movement relative to spindle 38. This limited movement is determined, as seen in FIGURE 4, by an abutment member 132 movable within a slot 134 in the bracket assembly 92. The rod 130 is biased to the left by a very light spring 136. When the wire conductor 128 is inserted into the stripper blade holder 116, the conductor will contact the end of rod 130, the rod thus serving as a stop means to determine the length of insulation which will be stripped from the conductor, such length being adjustable through a screw 137. Also upon contact of the rod 130 the conductor will force the rod to move to the right against the bias of spring 136 and this slight movement will cause the momentary energization of a suitable electrical device, not shown, to thereby send a signal to the press of the machine to commence an operative cycle.

A housing 138 is slidably disposed within spindle 38 and is carried at the end of rod 130. The housing 138 will reciprocate together with rod 130, however the rod 130 is capable of motion relative to housing 138 by virtue of a yieldable connection 140 between the two parts. A pin 142 is secured to the end of rod 130 and pivotally secures thereto a flipper member 144. A second pin 146 is secured to flipper 144, pin 146 being disposed in a slot 148 formed in housing 138. Upon movement of rod 130 to the right as seen in FIGURE 8, the housing 138 will be moved along with rod 130 until the shoulders 150 contact the front bushing 34. At this point the housing 138 is prevented from further rightward movement and as the rod 130 continues its rightward movement the flipper 144 is caused to travel in a counterclockwise direction. This movement of flipper 144 is for the purpose of ejecting the stripped portion of insulation from the machine. The flipper is shown in FIGURE 4 in its ejecting position.

Turning again to FIGURES 3 and 4 there is shown a slidable member 152 pivotally connected to a link 154. The link 154 pivots about pin 156 on bracket 42 and has a bifurcated end 158 for engaging a pin 160 on the slide 62. It can be seen that movement of slide 152 will cause pivoting movement of link 154 thereby causing movement of slide 62. Member 152 is actuated by a camming surface 162 formed on the ram 24. Main slide 44 is actuated by a second camming surface 164 also formed on ram 24, camming surface 164 contacting a roller 166 formed on the end of slide 44.

The operation of the machine thus far described will now be set forth. The machine begins in its at rest position shown in FIGURES 2 and 3. A wire conductor is inserted between the stripper blades 120 and contacts the end of rod 130, thereby moving the rod slightly to the right causing a suitable switch or relay to signal the press and thereby begin the cycle of operation. The ram 24 begins its descent and camming surface 164 contacts roller 166 causing the main slide 44 to move to the right into its position shown in FIGURE 4. Movement of slide 44 to the right causes camming surface 54 to contact roller 52 thus swinging bellcrank 50 in a counterclockwise direction to thereby move slide 62 to the right. Movement of slide 62 causes the rightward movement of pin 64 to thereby close the wire gripping jaws 74 as shown in FIGURE 6. After the jaws have been closed the surface 82 on slide 44 contacts pin 84 to swing lever 86 in a counterclockwise direction thereby moving spindle 38 to the right. The spindle will be rotating all the while by reason of the constantly driven electric motor 98. Movement of spindle 38 to the right causes the cutting blades 120 to close on the wire conductor 128 to strip the insulation from the conductor and also causes the flipper 144 to eject the stripped insulation from the machine. At this time bracket assembly 92 will contact screw 104 causing rightward movement of block 102 to thereby pivot bellcrank 108 in a counterclockwise position to effect lowering of the gripping jaws 74 into a position whereby the stripped wire will be positioned directly above a terminal in position to be crimped thereto. Further descent of ram 24 causes camming surface 162 to act on member 152 to the right to thereby pivot link 154 in a clockwise direction to thereby move slide 62 to the left to cause opening of jaws 74. The ram 24 will then begin its ascent and camming surface 162 will clear slide 152, however slide 152 will not move as it is not subjected at this time to any forces. Subsequently camming surface 164 will clear roller 166 allowing main slide 44 to return to its leftward position under the influence of the return spring 56. Continued leftward movement of slide 44 causes the forward face 168 on depending leg 80 to contact pin 160 thereby moving slide 62 back to its original position and also insuring that bellcrank 52 returns to its position shown in FIGURE 3. The spindle is returned to its starting position by a return spring 170, see FIGURE 1, and the gripping jaws 74 are raised to their starting position by means of return spring 172, see FIGURE 1. It can therefore be seen that a wire conductor will be first stripped, then lowered into position within an electrical terminal such as 174 shown in FIGURE 2, and then a movable crimping head secured to the lower end of ram 24 will effect a crimped connection between the connector and the terminal.

Figure 11:
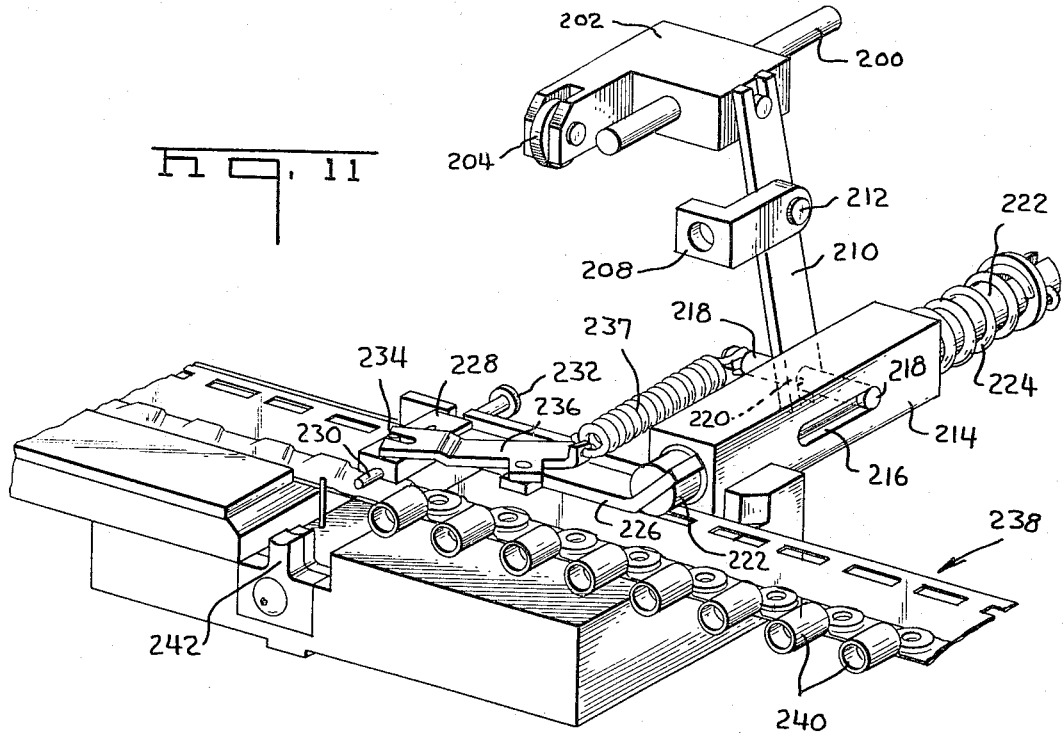
FIGURE 11 is a perspective view showing an alternative form of the present invention for use on closed barrel terminals.

The machine thus far described can operate only on a terminal having an open barrel since the wire conductor is caused to be lowered directly into such barrel. When closed barrel terminals are used additional means must be provided for locating the wire conductor within the closed barrel. FIGURES 11 through 17 show a modification which allows the aforedescribed machine to operate on closed barrel terminals. In FIGURE 11 there is shown a mechanism which can be readily added to the machine shown in FIGURES 1 through 10 to adapt such machine to closed barrel operation. For ease of illustration the machine of FIGURES 11 through 17 has been shown as having a righthand terminal feed as opposed to the lefthand feed shown in FIGURE 1. A rod 200 is secured to upper arm 22 and serves as a guide for the reciprocating motions of a slide member 202. Slide 202 has a cam roller 204 for engaging a camming surface 206 on the ram 24. A bracket 208 is also secured to upper arm 22 and pivotally carries a lever 210. Movement of slide 202 will cause oscillatory movement of lever 210 about its pivot point 212 on bracket 208. A hollow housing 214 is secured to the bed of the applicator and has an elongated slot 216 in the sides thereof for accommodating a pin 218 which pin is engaged in a slot 220 in the lower end of lever 210. A rod 222 is slidably disposed within housing 214 and is biased by a spring member 224. The pin 218 extends through a circular opening in rod 222 so that movement of pin 218 along slot 216 causes movement of rod 222 within the housing 214. The rod 222 is slotted at its end to receive an arm 226 of the stuffer member. The arm 226 terminates in a stuffing head 228. A locating pin 230 is slidably disposed within stuffing head 228. Pin 230 has an enlarged head 232 at one end and a radial extension 234 extending upwardly through a slot in stuffing head 228. A forked lever 236 is pivotally carried by stuffer arm 226 and is engaged at its forked end with the radial arm 234. The opposite end of forked lever 236 is connected by means of a spring 237 to an end of pin member 218.

A strip 238 of terminals is shown and consists of a plurality of closed barrel terminals 240 carried between two layers of plastic. The terminals 240 are fed one at a time into a position adjacent the stationary crimping die 242.

Figure 13:
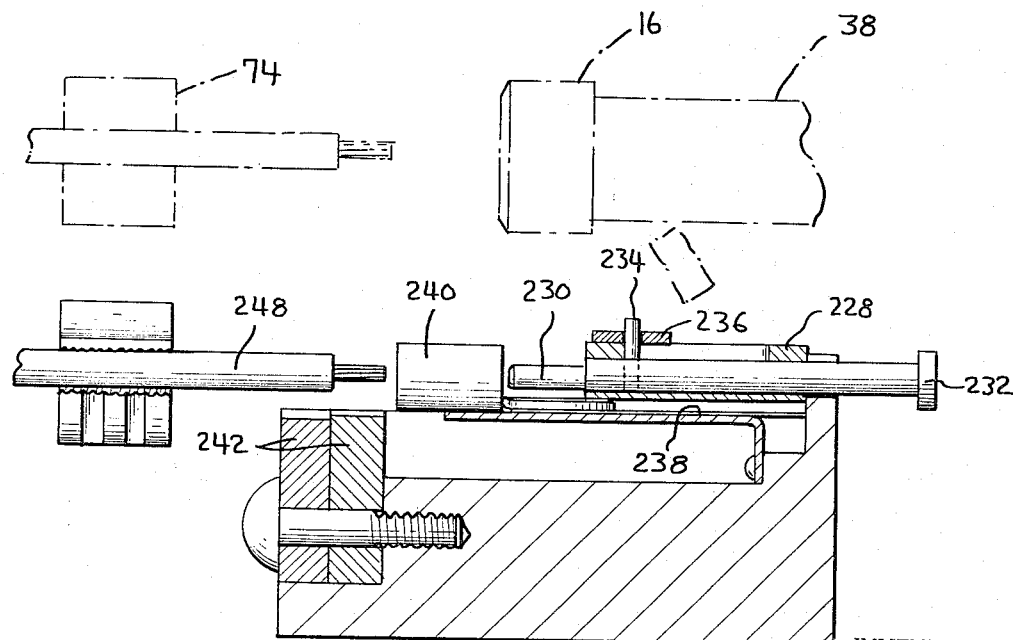

As ram 24 descends cam surface 206 will contact roller 204 causing rightward movement of slide 202 as seen in FIGURE 12 to thereby rotate lever 210 in a clockwise direction. It is important to note the relative position of cam surface 206 relative to cam surface 164. It is remembered that cam surface 164 controls the movement of main slide 44 and therefore controls the lowering of gripping jaws 74. The gripping jaws 74 must assume their lowered position prior to actuation of the mechanism shown in FIGURE 11 and therefore it can be seen in FIGURE 12 that the starting point 244 of cam surface 206 is generally opposite the end point 246 of camming surface 164. Therefore after the jaws have been lowered the lever 210 is caused to rotate clockwise thereby moving rod 222 to the left and consequently stuffing head 228 to the left. FIGURE 13 shows the relative position of the stuffing head, terminal, and conductor at the start of the stuffing operation. The head 228 and locating pin 230 move in unison with the pin 230 entering the barrel of the terminal as seen in FIGURE 14. After limited movement of pin 230 the enlarged head 232 of the pin contacts the rearward surface of the applicator bed thereby preventing further movement of the pin. The stuffing head 228 however continues its movement and engages the barrel of the terminal and begins to move the barrel towards the left as seen in FIGURE 15. It is noted in FIGURE 15 that the pin 230 and the center conductor of the wire 248 are both disposed within the barrel of the terminal thereby insuring that at all times the terminal will be properly located relative to the wire. The stuffing head 228 continues to move the barrel of the terminal until it reaches its proper position as shown in FIGURE 16. At this time the movable crimping head 250 will engage the barrel of the terminal and, in cooperation with fixed crimping die 242, will firmly secure the terminal to the wire conductor. As the ram ascends the camming surface 206 will clear roller 204 and the rod 222 will be moved to its starting position by means of return spring 224. The locating pin 230 will be returned to its original position by return spring 237. It can thus be seen that by adding a stuffing member to the device of FIGURES 1 through 10 the machine can be adapted for use with closed barrel terminals.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. Apparatus for stripping insulation from a wire conductor comprising a blade holder secured to a spindle, means for rotating said holder and spindle about an axis passing centrally through said holder, means to axially displace said holder and spindle, a central aperture extending axially through said holder, a conical recess formed in the forward face of said holder and terminating in said axial aperture, a pair of cutting blades pivotally secured to the rearward face of said holder and biased into a normally closed position, said cutting blades when in their normally closed position cooperating to form a circular cutting edge axially aligned with the aperture in said holder, and an insulation support extending rearwardly from said cutting edges, said insulation support being axially aligned and integral with said cutting edges, said cutting edges being operative upon displacement of said spindle.

2. Wire stripping apparatus as set forth in claim 1 wherein the diameter of said cutting edge is slightly larger than the diameter of the wire portion of said wire conductor.

3. Apparatus for stripping wire as set forth in claim 1 wherein said cutting blades are pivoted out of engagement with each other by the insertion of a wire conductor through the aperture in said holder and wherein said cutting blades are pivoted into engagement with each other upon axial movement of said holder relative to said wire conductor.

4. Apparatus for stripping a wire conductor comprising a spindle, means to rotate said spindle, means to displace said spindle in an axial direction, a blade holder secured to said spindle for rotation and axial displacement therewith, said holder having a tapered recess extending from the forward face of said holder and terminating in an aperture extending axially through said holder, means adjacent the forward face of said holder for gripping the insulation on said wire conductor, said gripping means being movable from an open position to a closed wire gripping position, a pair of cutting blades pivotally secured to the rearward face of said holder, said cutting blades being movable between a closed wire stripping position and an open wire receiving position, a circular cutting edge formed by said cutting blades in their closed position, said cutting edge having a diameter slightly greater than the diameter of the wire of said wire conductor, said cutting blades further having insulation support means extending rearwardly from said cutting edges and integrally therewith, whereby a wire conductor inserted through said aperture in said holder will be gripped by said gripping means and stripped by said cutting blades upon axial displacement of said spindle.

5. Apparatus for stripping the end of a wire conductor comprising a spindle, means to rotate said spindle about its longitudinal axis, means to axially displace said spindle, a blade holder secured to said spindle and adapted to receive a wire conductor axially therethrough, gripping means adjacent the forward face of said holder and movable between an open position and a closed wire gripping position to retain said wire conductor against axial movement upon axial reciprocation of said spindle, a pair of cutting blades located adjacent the rearward face of said holder and having a cutting edge, said cutting blades being pivotable to an open position upon insertion of a wire conductor into said holder and being pivotable to a closed wire stripping position upon axial reciprocation of said holder, said cutting blades being normally biased into their closed position and being rotatable and axially displaceable with said spindle, and wire insulation support means integral with said cutting edge and extending rearwardly therefrom for engaging the stripped portion of insulation on said wire conductor whereby the wire strands of said wire conductor will be axially twisted upon reciprocation of said spindle.

6. Apparatus for stripping the end of a wire conductor as set forth in claim 5 further comprising a flipper carried by said spindle for axial reciprocation therewith, said flipper being arcuately movable for ejecting the stripped portion of insulation of said wire conductor.

7. Apparatus for stripping the end of a wire conductor as set forth in claim 6 wherein the arcuate movement of said flipper is responsive to the axial reciprocation of said spindle.

8. A combined wire stripping and terminal applying apparatus comprising a ram, means to reciprocate said ram, a first camming surface secured to said ram, a first slide member reciprocable in response to engagement with said first cam, a pair of wire gripping jaws, means to close said jaws in response to movement of said first slide member, an elongated spindle having a wire stripping tool affixed to the end thereof, means for rotating said spindle, means responsive to movement of said first slide member for axially shifting said spindle to effect a stripping operation, additional means responsive to movement of said spindle for effecting movement of said wire gripping jaws from a position adjacent the said stripping means to a position adjacent a terminal applying means, a second camming surface affixed to said ram, a second slide member movable in response to engagement with said second camming surface, means responsive to movement of said second slide member for opening said wire gripping jaws, and means affixed to the lower end of said ram for applying a terminal to the stripped wire conductor.

9. A combined wire stripping and terminal applying machine as set forth in claim 8 further comprising wire locating means disposed within said spindle, and means responsive to contact between said wire conductor and said wire locating means for effecting the reciprocation of said ram.

10. A combined wire stripping and terminal applying machine as set forth in claim 8 further comprising means movable with said spindle for ejecting the stripped portion of insulation from said wire conductor.

11. A combined wire stripping and terminal applying machine as set forth in claim 8 further comprising means to adjust the amount of insulation stripped from said wire conductor.

12. A combined wire stripping and terminal applying machine as set forth in claim 8 further comprising a third camming surface fixed to said ram, a third slide member movable in response to engagement with said third camming surface, means movable into engagement with a terminal in response to movement of the said third slide member, said terminal engaging means effecting axial movement of said terminal relative to said wire conductor to thereby position the stripped end of said wire conductor within the barrel of said terminal.

13. A combined wire stripping and terminal applying machine as set forth in claim 12 further comprising terminal locating means carried by said terminal engaging means and slidably movable relative thereto.

References Cited

UNITED STATES PATENTS

| | | | |
|---|---|---|---|
| 1,314,759 | 9/1919 | Silvernail | 81—9.5 |
| 1,835,597 | 12/1931 | Hill et al. | 81—9.51 |
| 1,921,384 | 8/1933 | Crowell | 81—9.51 |
| 2,407,233 | 9/1946 | Greer et al. | 81—9.5 |
| 2,768,425 | 10/1956 | Andren | 29—630 |
| 3,184,950 | 5/1965 | Sitz | 72—331 |

THOMAS H. EAGER, *Primary Examiner.*